Sept. 29, 1964  H. M. DESS ET AL  3,150,988
PREPARATION OF FOAMED REFRACTORIES
Filed Dec. 20, 1960
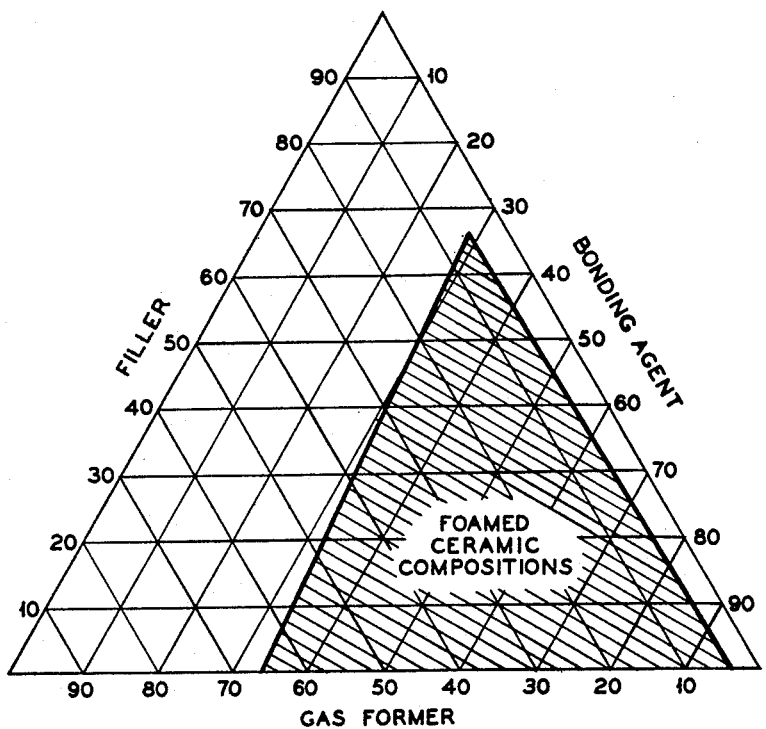
ALL VALUES EXPRESSED IN PARTS PER HUNDRED
INVENTOR.
HOWARD M. DESS
HERMAN F. KUMMERLE
BY
*Thomas L. O'Brien*
ATTORNEY

… … …

United States Patent Office 3,150,988
Patented Sept. 29, 1964

3,150,988
PREPARATION OF FOAMED REFRACTORIES
Howard M. Dess, Niagara Falls, and Herman F. Kummerle, Tonawanda, N.Y., assignors to Union Carbide Corporation, a corporation of New York
Filed Dec. 20, 1960, Ser. No. 77,064
8 Claims. (Cl. 106—40)

The present invention relates to foamed inorganic structural and insulating materials and to a process for their preparation.

It is an object of the present invention to provide a foamed inorganic refractory material which is light, porous, impact-resistant, moisture-resistant, and which is suitable for employment as, for example, structural or insulating material at moderately elevated temperatures.

It is another object of this invention to provide a commercially economical process for the preparation of light, porous, impact-resistant and moisture-resistant foamed ceramic materials.

Other objects and advantages of the present invention will be apparent from the following description and appended claims, taken in conjunction with the attached drawing in which:

The single figure shows a ternary compositional diagram defining the reaction mixture for the reduction of the foamed refractory materials of the present invention.

Briefly stated, the process which satisfies the objects of the present invention comprises mixing a finely-divided combination of an inorganic gas former and an inorganic filler, adding such mixture to an aqueous solution of a polymerizable binding composition, and heating the entire mass to cause the release of gaseous substances in the form of a foam and the progressive setting or polymerization of the binder.

An alternate method which equally satisfies the object of the present invention comprises mixing in the dry state a finely-divided combination of an inorganic gas former, an inorganic filler and a bonding agent; adding subsequently the required amount of water and heating the entire mass to cause the release of gaseous substances and the polymerization setting of the bonding agent.

The gas former employable may be any substance which is capable of reacting with either the water of the aqueous solution of the bonding agent or with the hydroxyl ions contained therein, thus releasing a gas. A typical gas former, suitable for the process of this invention, is, for example, silicon because of its ready reaction with the aqueous bonding agent.

The filler usable may be any substance which, as an additive, is not susceptible of undesirable side reactions with the solution of the bonding agent. Typical fillers are such materials as silica, silicon, silicon nitride, fibers, mica, fly ash (nominally 45% $SiO_2$, 22% $Al_2O_3$, 22% $Fe_2O_3$, 6% C), high-alumina slags, high silica slags, and various other metal oxides, nitrides and carbides. Preferred fillers, however, are inert slag materials or alumina.

Suitable bonding agents, that is, liquid or water soluble substances possessing the unique characteristics of being readily foamed and then set are, for example, water-soluble silicates, borates and phosphates of alkali metals. Preferred bonding agents are the sodium silicates because their aqueous solutions can be prepared sufficiently alkaline enough to react readily with silicon and viscous enough to permit ready entrapment of the gas produced, with resultant foam build-up and setting occurring in a fashion which is amenable to control. In addition, sodium silicates are relatively inexpensive and readily available.

The solid-dry components of the mixture used in the instant process should be comminuted to at least 270 mesh particle size (U.S. sieve series) and, preferably, to less than 325 mesh particle size, so as to produce a more readily foamed, stronger and more uniform cellular product.

The mixture of gas former and filler may be mixed in the dry state with a hydrated form of the bonding agent and, then contacted with water to form the required homogeneous solution, or it may be added to an aqueous solution of the bonding agent and stirred therein at room temperature until a smooth and uniform slurry-like water solution is obtained, or it may be added to the bonding agent in an emulsified water-organic bath. In this case, emulsification of the bath is effected by contacting the water solution and a water-immiscible organic liquid, in a ratio of from about 55 to about 70 parts of organic liquid per 100 parts of solution and preferably in a ratio of 65 to 68 parts of organic liquid per 100 parts of solution with a suitable surfactant.

The organic liquids which may be considered suitable in emulsifying the water bath are those which are immiscible with water, possess a boiling point at standard pressure and temperature of from about 60° C. and about 96° C., and do not chemically react with the gas former, the filler or the bonding agent employed in the process. Thypical organic liquids meeting these requirements are, for example, some chlorinated hydrocarbons, such as trichloroethylene, 1,2-dichloropropane, 1,2-dichloroethane, chloroform and carbon tetrachloride. The organic liquid is emulsified in the solution by the addition of about 0.1% of a surfactant such as cetyl-trimethyl-ammonium bromide or quaternary ammonium salts of cocoanut oil.

The emulsion increases the fluidity of the solid inorganic mixture in the liquid and at the same time improves considerably the heat transfer characteristics of the system. Furthermore, the organic liquid supplies additional gas-generating power for the formation of a porous product.

The reaction that occurs between the gas forming constituent of the mixture and the alkaline solution in the slurry results in the release of hydrogen gas, which is primarily responsible for the foam formation. Since the reaction is exothermic, there is sufficient heat generated by the system to convert the water in the slurry to the vapor phase. Unless the escape of the water vapor is controlled, the slurry dries too rapidly and undesirable crusts form which inhibit foam growth. These are eliminated either by employing a stirring action, if a simple aqueous solution of the bonding agent is used, or by employing the water solution-emulsified organic liquid combination, in which case no agitation of the slurry is required. Control of the rate of vaporization of the water is not satisfactorily achieved if the ratio of organic liquid to water is either less than 55 or more than 70 parts of organic liquid per 100 parts of water which is equivalent to a water-to-organic liquid ratio in the range from about 1.82 to about 1.43.

The vessel containing this slurry is then heated by any suitable means, preferably while agitating, if an aqueous solution of bonding agent is employed, and the exothermic reaction between the bonding agent and the gas-former is thus caused to take place.

To aid in the control of the ensuing reaction, the amount of heat initially applied to the slurried mixture should be carefully controlled and the reaction temperature maintained between about 40° C. and about 80° C. and, preferably, between about 50° C. and about 60° C.

However, the foamed product may be further heat treated to render it more durable in water. This is done at temperatures of between 700° C. and 1000° C., so that the structure of the cellular inorganic material is altered by the ensuing partial vitrification of the originally heterogeneous system. It has been found that the compressive strength of the product is thus increased up to 50 percent and its resistance to water is greatly improved.

In carrying out the process of this invention, any conventional apparatus may be employed. The reaction is normally effected in metal containers, but other materials such as glass or even heavy paper may be used. The purpose for which the foamed ceramic is produced will determine, to some extent, the composition of the container material. Sometimes, it may be desired that the foamed ceramic react sufficiently with the container itself, so as to form a bond therewith, although it is normally preferred that the container be detachable from the product produced therein.

Foraminous materials may also be employed because of their structural characteristics which allow an unrestrained evolution of gas during the reaction. Typical foraminous materials suitable for this process are wire mesh screens, the openings of which are small enough to contain the slurried mixture. When wire mesh screens are used, the necessity of agitation is substantially eliminated because, as the slurried mixture rises within the container, the gas is allowed to escape also from the sides of the container.

With reference to the accompanying drawing which, illustratively, shows a composition consisting of a gas-former, a filler and an aqueous solution containing 37.6 percent by weight of a bonding agent it can be seen that a relatively limited and narrow range of compositions exists within the three-component system, wherein foamed ceramic products may be obtained possessing the desired physical properties.

Using as components of the illustration, silicon as the gas-former, silica as the filler and an aqueous solution of 37.6% sodium silicate as the bonding agent, the ternary composition required to produce the desired foamed ceramic, expressed in parts per hundred, is as follows:

Silicon (gas former) _____ 4 to 66
Silica (filler) _____ 0 to 66
Sodium silicate (bonding agent) _____ 29 to 96

If silicon is employed both as gas former and as filler, the parts of silicon required are from 4 to 66 and the silica component is reduced to 0 part per hundred.

The three-component range, given above, holds true regardless of what gas former, filler or bonding agent is employed, the graphic illustration representing merely the required, typical ternary composition.

The foamed ceramic material produced by the process of this invention has been found to possess a bulk density of about 20 to about 45 lbs./cu.-ft. and to have a plurality of adjacent voids, many of which are interconnected by capillary openings. The thermal conductivity of the product was found to be between 0.6 and 0.9 B.t.u./hr.-ft.$^2$-°F./in. in the mean temperature range of from 50° F. to 300° F., indicating the satisfactory insulating properties of the material.

It was found that it was more than preferable to occasionally stir the mixture in order to hinder the formation of blowholes and to encourage the formation of a product with a uniformly porous structure.

The composition of the bonding agent employed may vary within certain limits without departing from the scope of the invention. Thus, for example, the composition of sodium silicate may vary provided the required viscosity characteristics (100 to 70,000 centipoises at 68° F.) are maintained. These viscosities may be preserved if the relative weight percent of the components of the sodium silicate are maintained within the following limits:

$Na_2O$ may vary between 8 and 18
$SiO_2$ may vary between 28 and 36
$H_2O$ may vary between 46 and 64

Furthermore, the sum of all three components must equal 100 and the ratio $SiO_2/Na_2O$ must lie between 2 and 3.5.

To more clearly describe the processes of the invention, the following examples are set forth merely as illustrations of the scope of the invention and should not be construed as limitations thereon.

Example I

A mixture consisting of 14 parts of silicon, comminuted to 400 mesh particle size, and 100 parts of silica (crushed quartzite), also comminuted to 400 mesh particle size, was prepared in the solid state in a closed metal container by subjecting the two materials to a thorough shaking action. To this uniform mixture was added 80 grams of 41° Bé. sodium silicate solution (8.90% $Na_2O$, 28.7% $SiO_2$, 62.4% $H_2O$). The mixture was stirred into a uniformly smooth slurry and subsequently heated on a hot plate to 50–60° C. Stirring was continued during the heating operation in order to achieve an efficient and properly distributed heat transfer. When the reaction became self-supporting, and gas evolution was noted, the container was removed from the hot plate and the reaction was allowed to go to completion. After removal of the product, this was found to consist of a hard, porous mass of foamed refractory material.

Example II

Following the procedure of Example I, 120 parts of silicon, comminuted to 400 mesh particle size, were mixed with 104 parts of 41° Bé. sodium silicate solution. In this experiment, the silicon was intended to act both as a gas former and as a filler. The product obtained was treated for shock resistance by heating in air over an open Meeker burner flame for four hours and plunging it instantly into a pan of water. The sample did not break or crumble, indicating a great resistance to thermal shock.

Example III

A sodium phosphate solution consisting of 13.2 parts of $NaH_2PO_4$ and 8 parts of NaOH dissolved in 32 parts of water was prepared and employed as bonding agent. Following the procedure of Example I, 32 parts of this solution were mixed with 10 parts of silicon powder acting both as gas former and filler. After the reaction was terminated, according to the method used in Example I, a highly porous and low-density material was obtained.

Example IV

The experiment described in Example I was repeated in a slightly modified manner. The modification consisted of incorporating in the sodium silicate solution 3 grams of glass wool fibers per 100 grams silica, the fibers ranging in length from about 0.5 to about 2.5 inches. The product obtained was found to have a compressive strength of about 200#/in.$^2$.

Example V

Fourteen grams of finely-divided silicon and two hundred grams of finely-divided silica were intimately mixed. In a separate container, 79 grams of sodium silicate, 14.3 milliliters of water, and 0.35 gram of a quaternary ammonium salt of cocoanut oil were thoroughly blended. The dry ingredients were mixed with the liquid blend and to this slurry 35.7 milliliters of trichloroethylene were added and the entire mass was thoroughly mixed. This slurry was poured into a one-quart metal can and heated gently on a hot plate to about 50° C. at which temperature the exothermic reaction began. The container was then immediately removed from the heat source and allowed to expand freely without agitation. The resulting product had a uniform foamy appearance and exhibited no blowholes or other manifestations of channeling.

Example VI

The foamed product, prepared according to the procedure set forth in Example I, was subjected to a second heat treatment at temperatures of 1000° C. for 48 hours.

It was observed that the original system was partially vitrified. The product, after cooling had a density of 18 lbs./ft.$^3$, was found to possess a compressive strength of 150#/in.$^2$ and to resist attacks by boiling water for about 35 hours without apparent damaging effect.

What is claimed is:

1. A process for the preparation of light, porous, impact-resistant refractory materials which comprises admixing from about 4 to 66 parts finely-divided, gas-forming silicon, up to about 66 parts of a finely-divided inorganic filler selected from the group consisting of silica, silicon, silicon nitride, fibers, mica, fly ash, high-alumina slags, high-silica slags, metal oxides, and metal carbides, and from about 29 to about 96 parts a bonding agent selected from the group consisting of alkali metal silicates, alkali metal borates and alkali metal phosphates; forming a slurry of the resulting first mixture with a second mixture consisting of water, a water-immiscible and chemically unreactive liquid chlorinated hydrocarbon having a boiling point in the range from about 60° C. to about 96° C., and a surfactant, the ratio of the water to the chlorinated hydrocarbon being from about 1.43 to about 1.82 and the surfactant being present in sufficient quantities to emulsify the chlorinated hydrocarbon; and thereafter heating the resulting slurry to a temperature sufficient to initiate a self-supporting reaction between the bonding agent and the gas-forming silicon.

2. The process in accordance with claim 1, wherein the ceramic material thus prepared is further heat-treated at temperatures of from about 700° C. to about 1000° C. for a sufficient time period to bring about a partial vitrification of the refractory material.

3. The process in accordance with claim 1, in which the gas forming substance is silicon, the filler is silicon dioxide, and the bonding agent is a 37.6 percent by weight sodium silicate aqueous solution.

4. The process in accordance with claim 1, in which the gas forming substance and the filler are silicon, and the bonding agent is a 37.6 percent by weight sodium silicate aqueous solution.

5. The process in accordance with claim 1, in which the gas forming substance and the filler are silicon and the bonding agent is a sodium phosphate aqueous solution.

6. The process in accordance with claim 1, in which the bonding agent consists of 8 to 18 parts of sodium monoxide, 28 to 36 parts of silicon dioxide, and 46 to 64 parts of water, the sum total of said sodium monoxide, silicon dioxide and water being 100 parts and the ratio of silicon dioxide to sodium monoxide being between 2 and 3.5.

7. The process in accordance with claim 1, in which glass fibers of from 0.5 to about 2.5 inches in length and in amounts of from 1 to 5 grams of glass fiber per 100 grams of filler are added to the slurry.

8. The process in accordance with claim 1, wherein the slurry is heated in a container consisting of wire mesh screen.

References Cited in the file of this patent

UNITED STATES PATENTS

| | | |
|---|---|---|
| 1,790,272 | Leasman | Jan. 27, 1931 |
| 1,818,888 | Frank et al. | Aug. 11, 1931 |
| 1,944,008 | Hobart | Jan. 16, 1934 |
| 1,975,078 | Boughton | Oct. 2, 1934 |
| 2,526,066 | Croce | Oct. 17, 1950 |
| 2,636,825 | Nicholson | Apr. 28, 1953 |
| 2,744,022 | Croce | May 1, 1956 |
| 2,921,357 | Fujii et al. | Jan. 19, 1960 |
| 3,052,949 | Williams et al. | Sept. 11, 1962 |

FOREIGN PATENTS

| | | |
|---|---|---|
| 258,616 | Great Britain | Mar. 10, 1927 |
| 336,318 | Great Britain | Oct. 16, 1930 |
| 364,819 | Great Britain | Jan. 14, 1932 |
| 539,708 | Great Britain | Sept. 22, 1941 |
| 633,114 | Great Britain | Dec. 12, 1949 |
| 633,146 | Great Britain | Dec. 12, 1949 |
| 663,568 | Great Britain | Dec. 27, 1951 |

OTHER REFERENCES

Mellor: "Comprehensive Treatise in Inorganic and Theoretical Chemistry" (1925), Longmans, Green, volume VI (page 161).